United States Patent
Nakamura et al.

(10) Patent No.: US 7,627,765 B2
(45) Date of Patent: Dec. 1, 2009

(54) DOCUMENT MANAGEMENT APPARATUS AND DOCUMENT MANAGEMENT METHOD, AND STORAGE MEDIUM STORING PROGRAM

(75) Inventors: Osamu Nakamura, Yokohama (JP); Mitsuru Aonuma, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 805 days.

(21) Appl. No.: 11/139,544

(22) Filed: May 31, 2005

(65) Prior Publication Data

US 2006/0095795 A1     May 4, 2006

(30) Foreign Application Priority Data

Nov. 4, 2004     (JP)  .............. 2004-320143

(51) Int. Cl.
*H04L 9/32* (2006.01)
(52) U.S. Cl. ...................... 713/181; 713/176
(58) Field of Classification Search ............... 713/181
See application file for complete search history.

(56) References Cited

U.S. PATENT DOCUMENTS

| | | | |
|---|---|---|---|
| 5,883,956 A * | 3/1999 | Le et al. ............... 713/170 |
| 7,281,020 B2 * | 10/2007 | Fine ................. 707/104.1 |
| 2004/0153653 A1 * | 8/2004 | Abhyankar et al. ....... 713/179 |
| 2005/0127171 A1 * | 6/2005 | Ahuja et al. ............ 235/382 |
| 2005/0132046 A1 * | 6/2005 | de la Iglesia et al. ...... 709/225 |
| 2005/0132079 A1 * | 6/2005 | Iglesia et al. ........... 709/230 |
| 2005/0132198 A1 * | 6/2005 | Ahuja et al. ............ 713/176 |
| 2007/0266253 A1 * | 11/2007 | Fukasawa ............... 713/176 |

FOREIGN PATENT DOCUMENTS

JP     A 2004-240969     8/2004

* cited by examiner

*Primary Examiner*—Kambiz Zand
*Assistant Examiner*—Dant B Shaifer Harriman
(74) *Attorney, Agent, or Firm*—Oliff & Berridge, PLC

(57) ABSTRACT

A document management apparatus includes a hash generator that generates a hash value based on digital document data stored in a database, a communication unit that inputs time information, and a microfilm writer that performs processing to record a converted document data, converted to image data based on the digital document data, on a microfilm, and record a document ID as identification information of the converted document data recorded on the microfilm, the hash value, and the time information, on the microfilm.

15 Claims, 8 Drawing Sheets

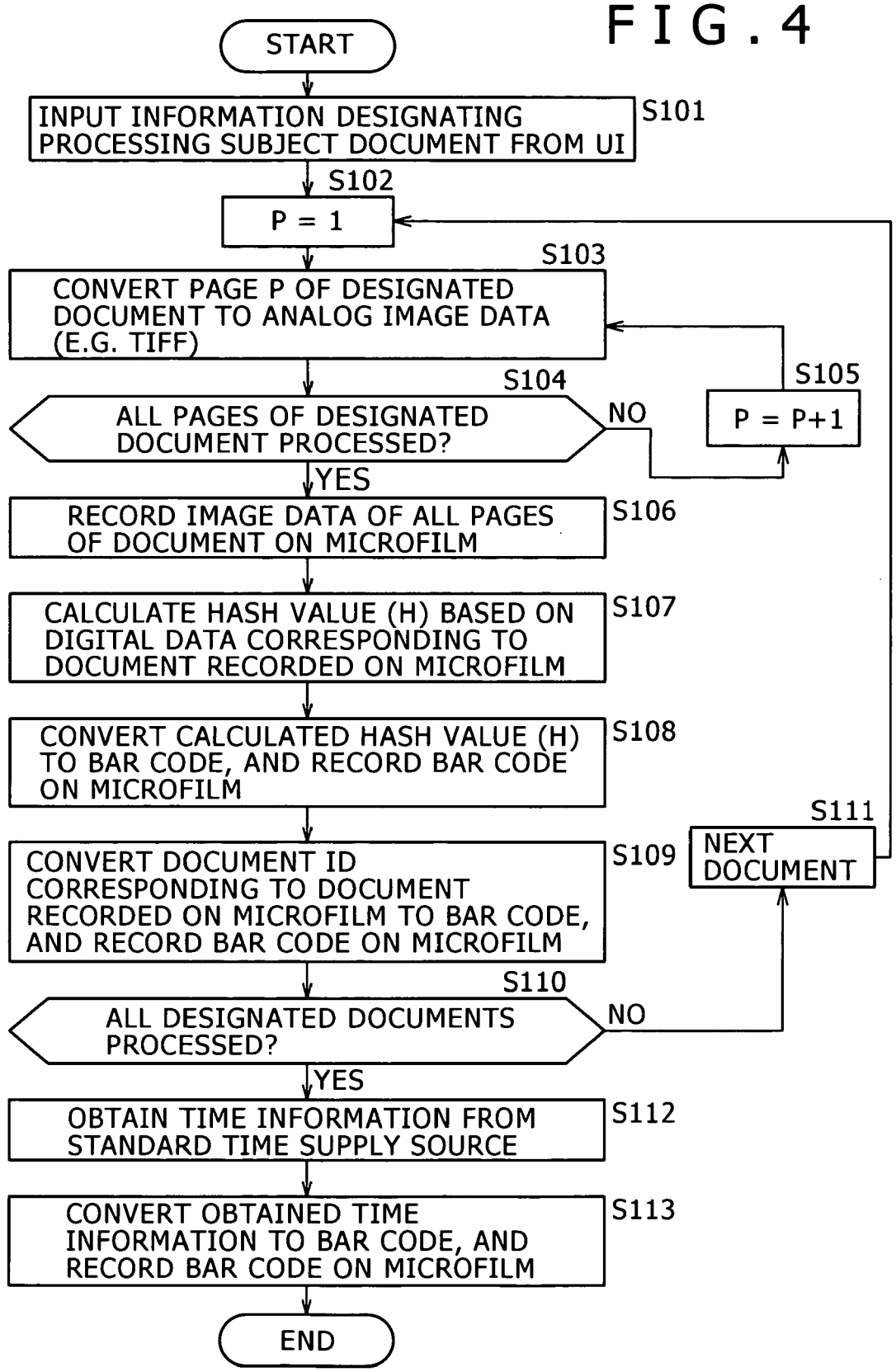

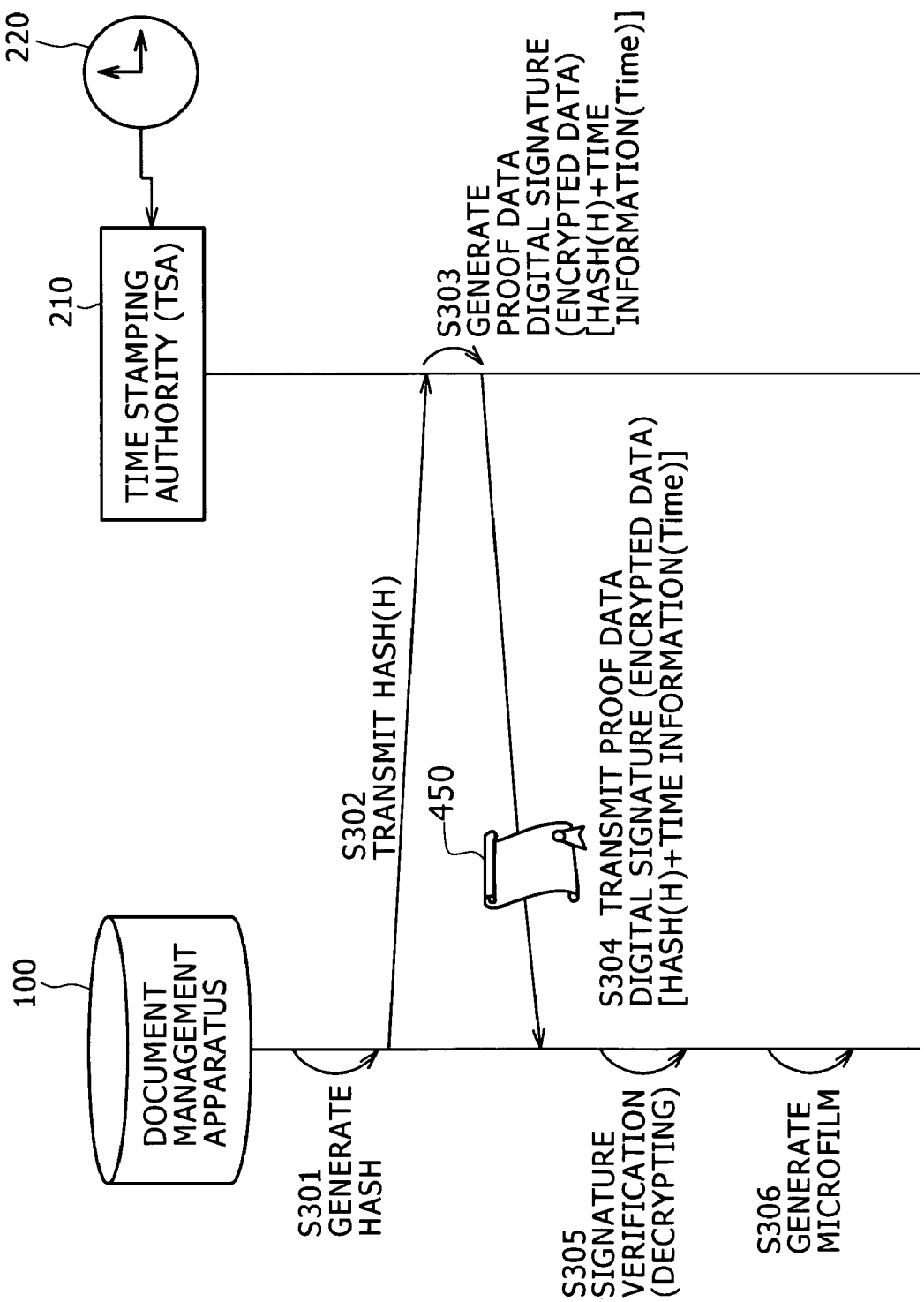

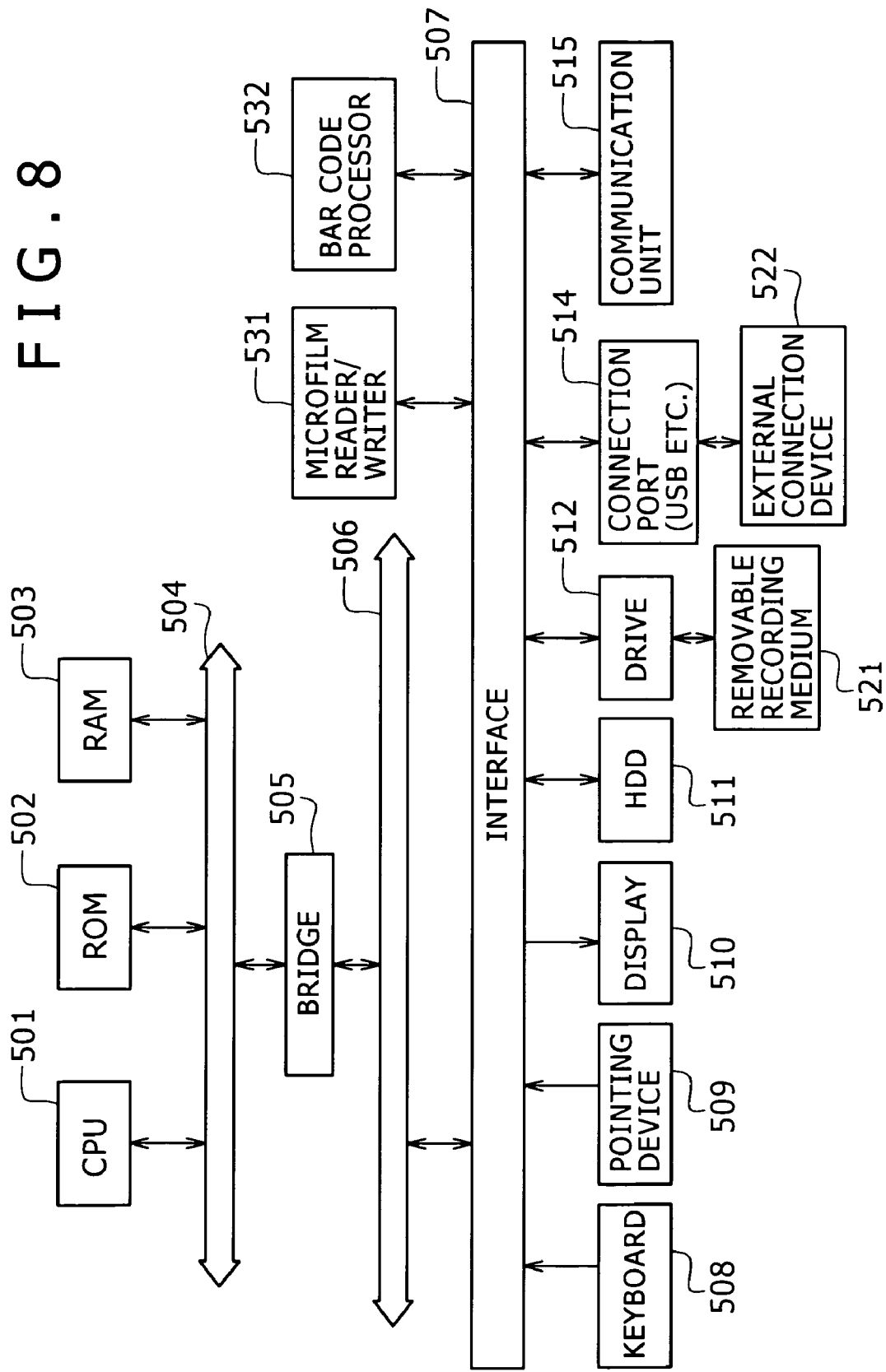

DOCUMENT MANAGEMENT APPARATUS AND DOCUMENT MANAGEMENT METHOD, AND STORAGE MEDIUM STORING PROGRAM

BACKGROUND OF THE INVENTION

1. Field of the Invention

The present invention relates to a document management apparatus and a document management method and a computer-readable storage medium storing a computer program. More particularly, the present invention relates to a document management apparatus having a construction capable of proving objective validity of document data, managed in a database, microfilm or the like, i.e., the date and time, nonoccurrence of tampering of the document data and the like, and a document management method and a computer program.

2. Description of the Related Art

In a construction to store and manage various document data including text data, image data and program data, when document data is stored in a database connected to e.g. a network, there is a probability of data tampering or the like by external unauthorized access. Recent document management systems employ various arrangements to prove the date and time of generation, nonoccurrence of tampering and the like of management subject document data.

It is known to provide a technique for proving the date and time of generation, nonoccurrence of tampering and the like of management subject document data, an arrangement utilizing time stamping. Time stamp is proof data issued from a time stamping authority (TSA) as a trusted third party. A digital signature as encryption data based on a private key from the time stamping authority is generated for data obtained by combining a hash value based on document data provided by a document management system with reliable time information obtained by the time stamping authority (TSA), and issued to the document management system. The protocol utilizing a time stamp issued from the time stamping authority (TSA) is referred to as a "simple protocol".

The simple protocol will be described with reference to FIG. 1. As shown in FIG. 1, a document management apparatus 11 which manages various documents transmits a hash value (H) based on management subject document data to a time stamping authority (TSA) 12. The time stamping authority (TSA) 12 generates a digital signature by using a private key from the time stamping authority (TSA) 12 compliant with Public Key Infrastructure (PKI) for data obtained by combining the received hash value (H) with time information (Time) received from a reliable time information supply source 13. That is, a digital signature (Sig.) is applied to [hash value (H)+time information (Time)], thereby proof data 21 as encrypted data is generated, and transmitted to the document management apparatus 11.

The document management apparatus 11 links the proof data 21, received from the time stamping authority (TSA) 12, with the document data to be stored in the database, i.e., document data as the source of the hash value (H), and stores the proof data 21.

Verification processing based on the proof data 21 is verification processing of the digital signature of the proof data 21, i.e., decrypting of the digital signature based on a public key from the time stamping authority (TSA) 12. The data as the combination of the hash value (H) and the time information (Time) is obtained by decrypting the digital signature by using the public key from the time stamping authority (TSA) 12. Further, the date and time of generation, nonoccurrence of tampering and the like of the document are verified by checking the correspondence between the hash value (H) obtained by decrypting the proof data 21 and a hash value (H') newly generated based on the document data managed in the document management apparatus 11. In this simple protocol, a public key and a private key compliant with the Public Key Infrastructure (PKI) are employed, and the public key applied upon verification processing based on the proof data 21, i.e., the public key from the time stamping authority (TSA) 12 is obtained from a public key certificate issued from a Certificate Authority (CA), thereby creditability of public key is guaranteed. However, generally, a validity period is set in a public key certificate since it can be considered that permanent use of the same key is prevented and the safety can be increased by updating a pair of public and private keys periodically.

However, when such key update is performed, update of the digital signature in the proof data 21 is required. That is, to generate a digital signature and perform verification using an updated valid pair of public and private keys, the proof data is updated upon each key update processing. As described above, the simple protocol has a problem that update processing is required due to the use of an encryption key based on the Public Key Infrastructure (PKI). Next, a linking protocol as a data proof protocol without Public Key Infrastructure (PKI) will be described with reference to FIG. 2.

As shown in FIG. 2, in the linking protocol, a hash value transmitted from a document management apparatus 31 has a sequence number n (1, 2, 3 . . . ). A time stamping authority (TSA) 32 generates document authentication linking data $[L_n]$ as a new hash value based on an n-th hash value [Hn] received from the document management apparatus 31, based on document authentication linking data $[L_{n-1}]$ as a hash value generated based on a hash value previously received from the document management apparatus 31, the sequence number [n] and the newly received hash value $[H_n]$. That is, $$Ln = \text{Hash}(L_{n-1}, n, Hn)$$

The new document authentication linking data $[L_n]$ is generated based on the above expression.

The time stamping authority (TSA) 32 generates the next document authentication linking data $[L_n]$ based on immediately-previously generated document authentication linking data $[L_{n-1}]$, and publicizes the linking data at a predetermined timing in a publication indicating a certifiable date of issuance such as a newspaper. In FIG. 2, linking data $[L_M]$ 41 is publicized in a newspaper 51 issued on Oct. 20, 2004, and linking data $[L_N]$ 42 is publicized in a newspaper 52 issued on Apr. 12, 2005.

The time stamping authority (TSA) 32 stores all the hash values $[H_n]$ sequentially received from the document management apparatus 31, all the linking data $[L_n]$ and sequence data [n].

In this manner, as the time stamping authority (TSA) 32 performs hash computation using immediately previous linking data and newly-received hash value upon linking data $[L_n]$ generation processing, the context of all the linking data can be specified. Verification processing is performed as follows. When data verification is performed upon publicizing of linking data $(L_n)$, the document management apparatus generates a hash value $(H_N')$ based on document data, and calculates a hash value $[L_N']$ based on the generated hash value $(H_N')$, linking data $(L_{N-1})$ held in the time stamping authority (TSA) 32 and a sequence number [N]. That is, the hash value $[L_N']$ is calculated as $$L_N' = \text{Hash}(L_{N-1}, N, H_N').$$

If the calculated hash value [$L_N'$] corresponds with the publicized linking data ($L_N$) in the newspaper, nonoccurrence of tampering is proved.

In the linking protocol, the proof data update accompanying the key data update compliant with the Public Key Infrastructure (PKI) as in the above-described simple protocol is unnecessary. However, as the time stamping authority (TSA) 32 needs to hold all the hash values [$H_n$] sequentially received from the document management apparatus 31, all the linking data [$L_n$] and sequence data [n], the load on data management is heavy. Further, as the linking data is periodically publicized in publication such as a newspaper, the cost for publicizing is increased.

SUMMARY OF THE INVENTION

The present invention has been made in view of the above circumstances.

According to an aspect of the invention, there is provided a document management apparatus including: a hash generator that generates a hash value based on digital document data stored in a database; a communication unit that inputs time information; and a microfilm writer that performs processing to record a converted document data, converted to image data based on the digital document data, on a microfilm, and record a document ID as identification information of the converted document data recorded on the microfilm, the hash value, and the time information, on the microfilm.

BRIEF DESCRIPTION OF THE DRAWINGS

Embodiments of the present invention will be described in detail based on the following figures, wherein:

FIG. 4 is a flowchart showing the details of the procedure of microfilm generation processing performed by the document management apparatus according to the present invention;

FIG. 7 is a sequence diagram showing microfilm generation processing utilizing a time stamping authority (TSA) in the document management apparatus according to the present invention; and FIG. 8 is a block diagram showing the hardware construction of the document management apparatus to perform the microfilm generation processing and the data verification processing according to the present invention.

DETAILED DESCRIPTION OF THE INVENTION

Hereinafter, a document management apparatus, a document management method, and a computer-readable medium storing a computer program of the present invention will now be described in detail in accordance with the accompanying drawings.

Figure 1:
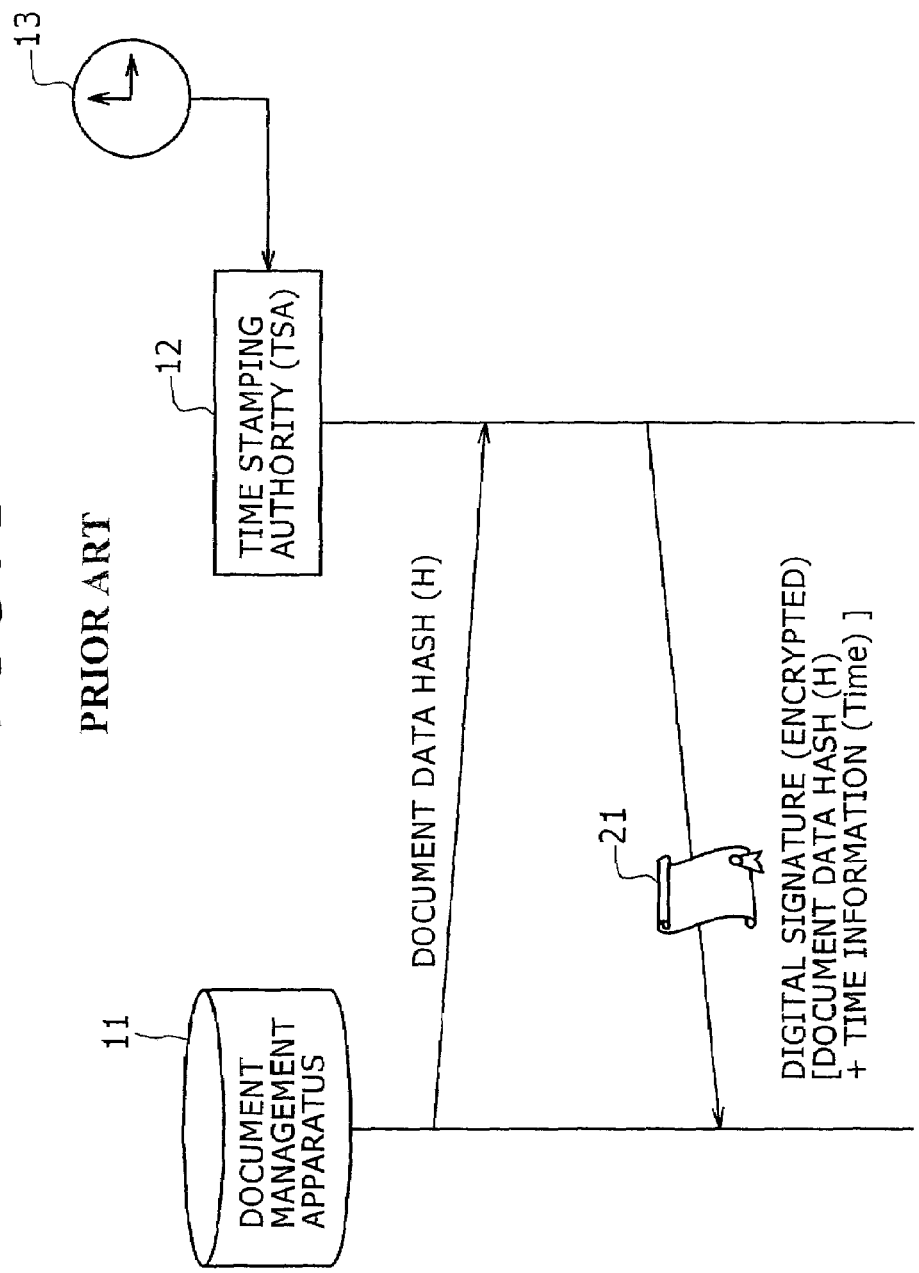
FIG. 1 is a sequence diagram showing the processing in the simple protocol known as a document data proof protocol according to the prior art.
Figure 2:
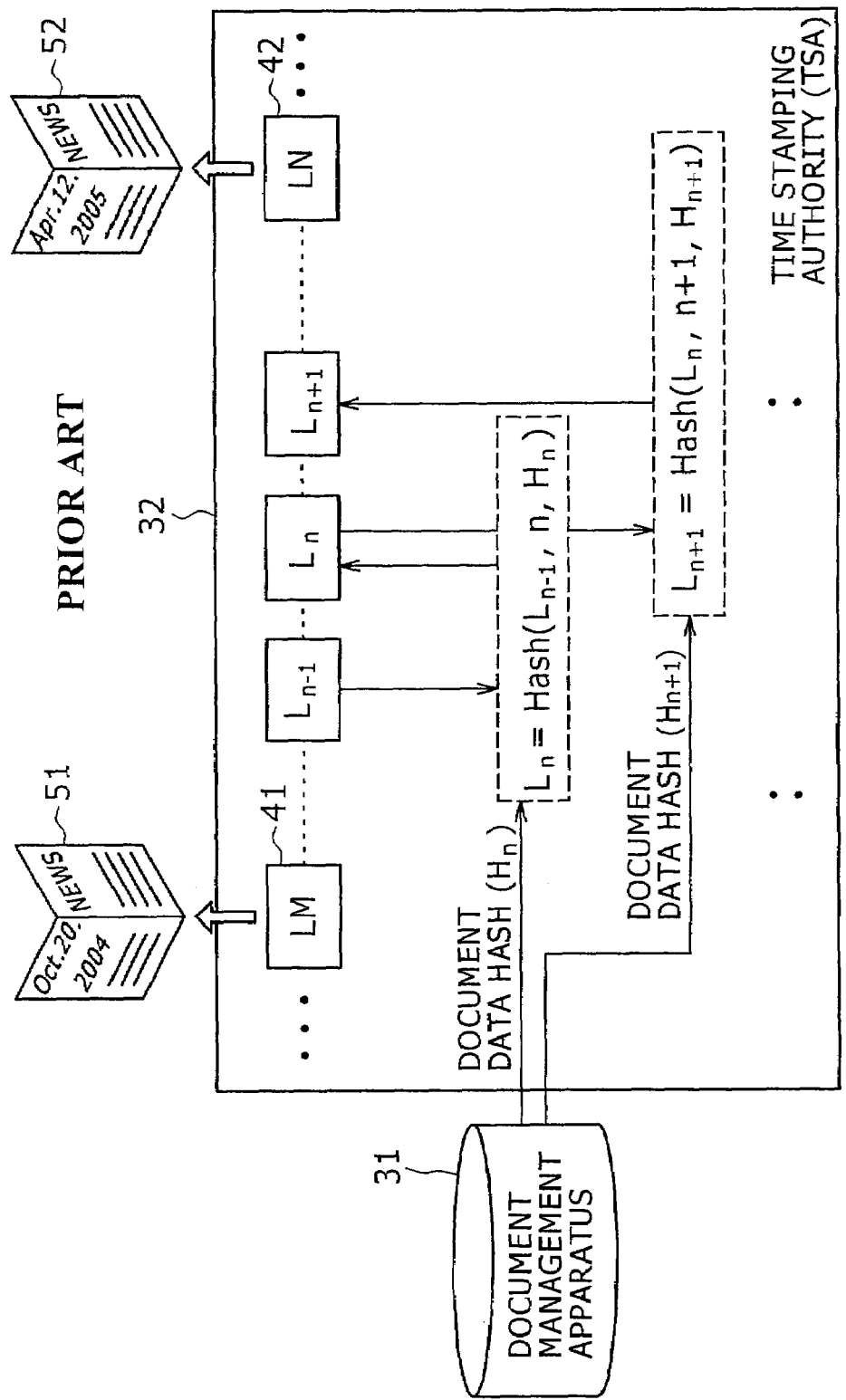
FIG. 2 is an explanatory view showing the processing in the linking protocol known as a document data proof protocol according to the prior art.
Figure 3:
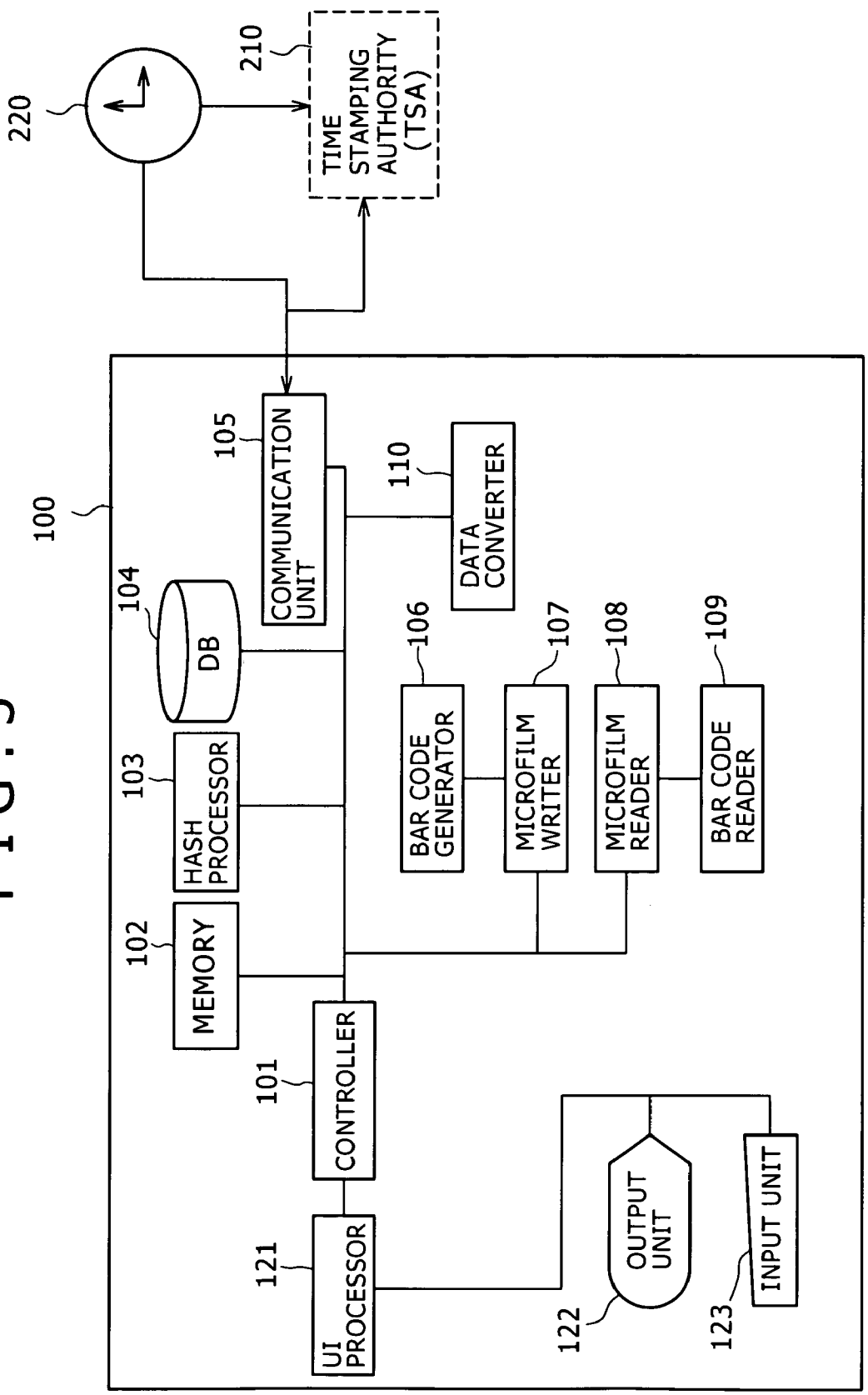
FIG. 3 is a block diagram showing the construction of a document management apparatus according to the present invention.

FIG. 3 shows the construction of the document management apparatus of the present invention. A document management apparatus 100 manages a multitude of document data stored in a database (DB) 104. Regarding the document data, proving of the occurrence/nonoccurrence of data tampering, the date of generation, the date and time of update, and the like, is required. Further, the document management apparatus generates a microfilm corresponding to the data stored in the database (DB) 104.

That is, the document management apparatus of the present invention is a hybrid system which performs processing to store digital data on a recording medium, e.g., a hard disk, a CD or a DVD in the database (DB) 104, and to generate a microfilm as analog data corresponding to the digital data stored in the database (DB) 104, thus manages document data as digital and analog data.

As shown in FIG. 3, the document management apparatus 100 has a controller 101, a memory 102, a hash processor 103, the database (DB) 104, a communication unit 105, a bar code generator 106, a microfilm writer 107, a microfilm reader 108, a bar code reader 109, a data converter 110, a user interface (UI) processor 121, an output unit 122 and an input unit 123.

The controller 101 performs data processing and data communication control in the document management apparatus 100. The controller 101 reads a computer program stored in the memory 102, and perform data processing in accordance with the program. The memory 102 is a storage having a hard disk, a ROM, a RAM and the like used as a computer program storage area, as a work area for the program, and as a parameter storage unit.

The hash processor 103 performs hash value generation processing based on management subject document data. The hash value generation processing is performed as processing using a predetermined hash function such as SHA-1 or MD5. The database (DB) 104 holds management subject data. As described above, regarding the management subject data, proving of occurrence/nonoccurrence of data tampering, the date and time of generation, the date and time of update, and the like, is required.

The communication unit 105 performs communication processing executed by the document management apparatus 100. For example, the communication unit 105 receives time information directly from a time information supply source 220 which performs processing to provide reliable time information. Otherwise, the communication unit 105 performs communication processing with a time stamping authority (TSA) 210 as a trusted third party connected to the apparatus via a network. Note that the processing sequence will be described with an example of the construction without the time stamping authority 210 as an embodiment 1, and with an example of the construction utilizing the time stamping authority 210 as an embodiment 2.

The microfilm writer 107 and the microfilm reader 108 perform data writing upon generation of microfilm as analog data corresponding to management subject document data and data reading from the generated microfilm. The bar code generator 106 performs processing to convert attribute data corresponding to document data recorded by the microfilm writer 107, i.e., a hash value and a document ID corresponding to the document data, time information as recording-execution time information, and the like, into bar codes. The bar code reader 109 performs reading processing to read the bar code information recorded, with the document data as the subject of management, on the microfilm.

The data converter 110 performs processing to convert digital document data stored in the database 104 to microfilm-recordable data format such as TIFF data format.

Note that upon recording of management subject document data by the microfilm writer 107, the document processing apparatus of the present invention performs processing to generate a hash value based on the document data, as proof data for proving occurrence/nonoccurrence of data tampering, the date and time of generation, the date and time of update and the like, by the hash processor 103, and further, to obtain time information from the outside via the communication unit 105, then convert these data pieces to bar codes and record, with the document data, on the microfilm. The details of the processing will be described later.

The user interface (UI) processor 121 performs input/output control on the output unit 122 and the input unit 123. The output unit 122 has a display such as a CRT or LCD, produces various information displays. The input unit 123, having a keyboard, a mouse and the like, is utilized for a user's information input.

The time stamping authority (TSA) 210 as shown in FIG. 3, as a trusted third party as described above, receives accurate time information (Time) from the reliable time information supply source 220.

As described above, the document management apparatus 100 performs reception of time information directly from the time information supply source 220 which performs processing to provide reliable time information, or performs reception of authentication information including time information by communication processing with the time stamping authority (TSA) 210 as a trusted third party connected to the apparatus via the network. Hereinafter, the details of the processing will be described with an example of the construction without the time stamping authority 210 as an embodiment 1, and with an example of the construction utilizing the time stamping authority 210 as an embodiment 2.

First, the example of processing by the document management apparatus 100 to receive time information directly from the time information supply source 220 without the time stamping authority 210, and utilize the received time information as a part of proof data for document data to be recorded on a microfilm, will be described. FIG. 4 shows a flowchart showing a processing sequence performed by the document management apparatus 100. The processing at respective steps will be described.

At step S101, information designating a processing subject document is inputted via the input unit 123 of the document management apparatus 100. The processing on the document is to generate a microfilm where converted document data as image data corresponding to the digital document data, as analog data corresponding to the digital data stored in the database 104, then upon generation of microfilm, generate proof data for proving occurrence/nonoccurrence of tampering, the date and time of generation, the date and time of update and the like of processing subject document data, and record the proof data on the microfilm.

At step S102, initialization setting is performed to set page designation information [p] of the processing subject document as p=1, to set the initial page as processed page. At step S103, processing to convert the processed page [p] of the processing subject document as digital data stored in the database 104, to image data as analog data (e.g. TIFF) thereby generation of converted document data is performed. This processing is performed by the data converter 110, to convert the digital data stored in the database 104 to microfilm-recordable format data. Note that the converted data format is not limited to TIFF but any other data format may be employed as long as it is a microfilm-recordable data format.

At step S104, it is determined whether or not the generation of analog image data for all the pages of the processing subject document has been completed. If an unprocessed page exits, the processed page [p] is updated at step S105, and the process proceeds to the data conversion processing at step S103.

When the data conversion for all the pages of the processing subject document has been completed, the process proceeds to step S106, at which image data (e.g. TIFF data) of the respective pages of data-conversion processed document is recorded on a microfilm. The data recording is performed by the microfilm writer 107.

Next, at step S107, a hash value (H) based on the document data recorded on the microfilm is calculated. This processing is performed by the hash processor 103 of the document management apparatus 100 shown in FIG. 3. The hash value (H) is generated based on digital data corresponding to the document data recorded on the microfilm. That is, a predetermined hash function such as SHA-1 or MD5 is applied to constitute bit values of the digital document data as an input value, and hash value (H) is calculated. Assuming that the hash function is (h) and the digital document data is (Document), the hash value (H) is calculated as follows.

$$H=h(Document)$$

Figure 5A:
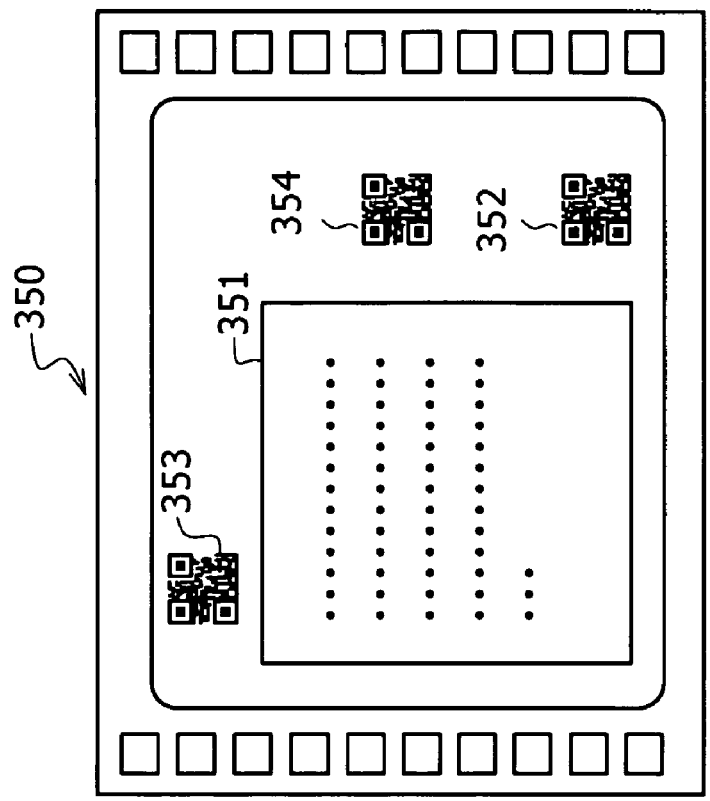
FIGS. 5A and 5B are examples of data recording structure in a microfilm generated by the document management apparatus according to the present invention.
Figure 5B:
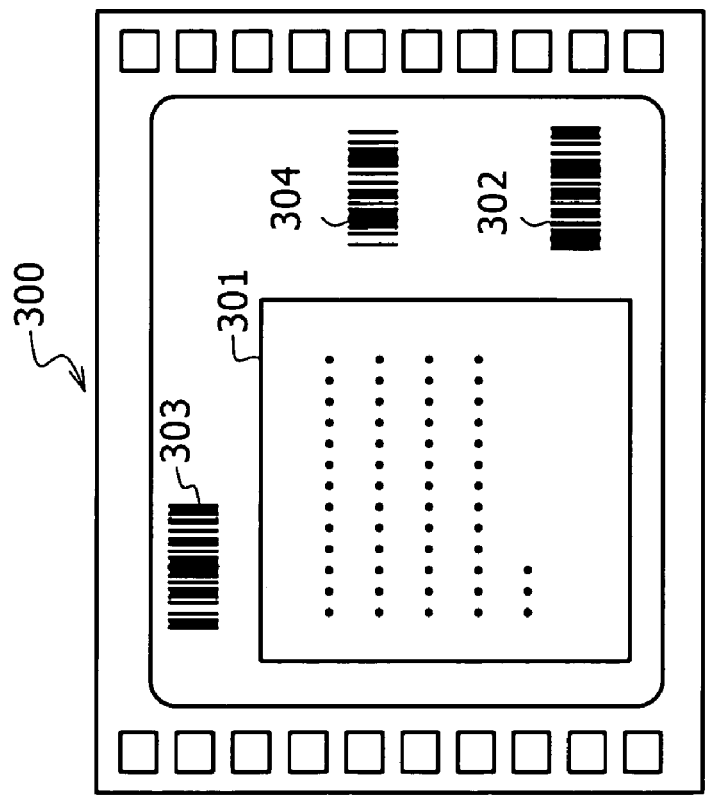

Next, at step S108, the calculated hash value (H) is converted to a bar code, and is recorded on the microfilm where the document data is recorded. The bar code conversion processing is performed by the bar code generator 106. The recording processing of the generated bar code is performed by the microfilm writer 106. FIGS. 5A and 5B show examples of data recording on the microfilm. FIG. 5A shows an example of recording using a one-dimensional bar code, and FIG. 5B, an example of recoding using a two-dimensional bar code. In a microfilm 300 shown in FIG. 5A, a hash value (H) 302 is recorded as a one-dimensional bar code on the right side of document data 301. In a microfilm 350 shown in FIG. 5B, a hash value (H) 352 is recorded as a two-dimensional bar code on the right side of document data 351.

Next, at step S109, a document ID corresponding to the microfilm-recorded document is converted to a bar code and recorded on the microfilm. The document ID is document identification data applied in the database 104 holding the digital document data. This document identification data is converted by the bar code generator 106 to a bar code, and the converted data is recorded by the microfilm writer 107. In the microfilm 300 shown in FIG. 5A, a document ID 303 is recorded as a one-dimensional bar code in an upper position of the document data 301. In the microfilm 350 shown in FIG. 5B, a document ID 353 is recorded as a two-dimensional bar code in an upper position of the document data 351.

At step S110, it is determined whether or not the recording processing for the designated processing subject document has been completed. If an unprocessed document exists, document update is performed at step S111, and the processing at step S102 and the subsequent steps is performed for the next processing subject document.

If it is determined at step S110 that the recording processing for the designated processing subject document has been completed, the process proceeds to step S112, at which time information is received from the time information supply source 220 (see FIG. 3). The time information supply source 220 is, in Japan, for example, standard time information generated by a third organization to provide the Japan standard time including year/month/day and time information. When time information from the time information supply source 220 has been inputted via the communication unit 105, the time information is converted by the bar code generator 106 to a bar code, and the converted data is recorded by the microfilm writer 107.

In the microfilm 300 shown in FIG. 5A, time information 304 is recorded as a one-dimensional bar code on the right side of the document data 301. In the microfilm 350 shown in FIG. 5B, time information 354 is recorded as a two-dimensional bar code on the right side of the document data 351.

In this manner, in the document management apparatus of the present invention, document data recorded in a database is recorded, with a document ID, on a microfilm, and further, a hash value based on the document data, and time information provided by a trusted third party, are recorded on the microfilm where the document data is recorded. In this arrangement, proving of occurrence/nonoccurrence of data tampering, the date and time of generation, the date and time of update and the like, can be implemented. Further, as the procedure of proof data update or the like can be omitted and the periodical publicizing on newspaper or the like can be omitted, efficient data management can be implemented.

Figure 6:
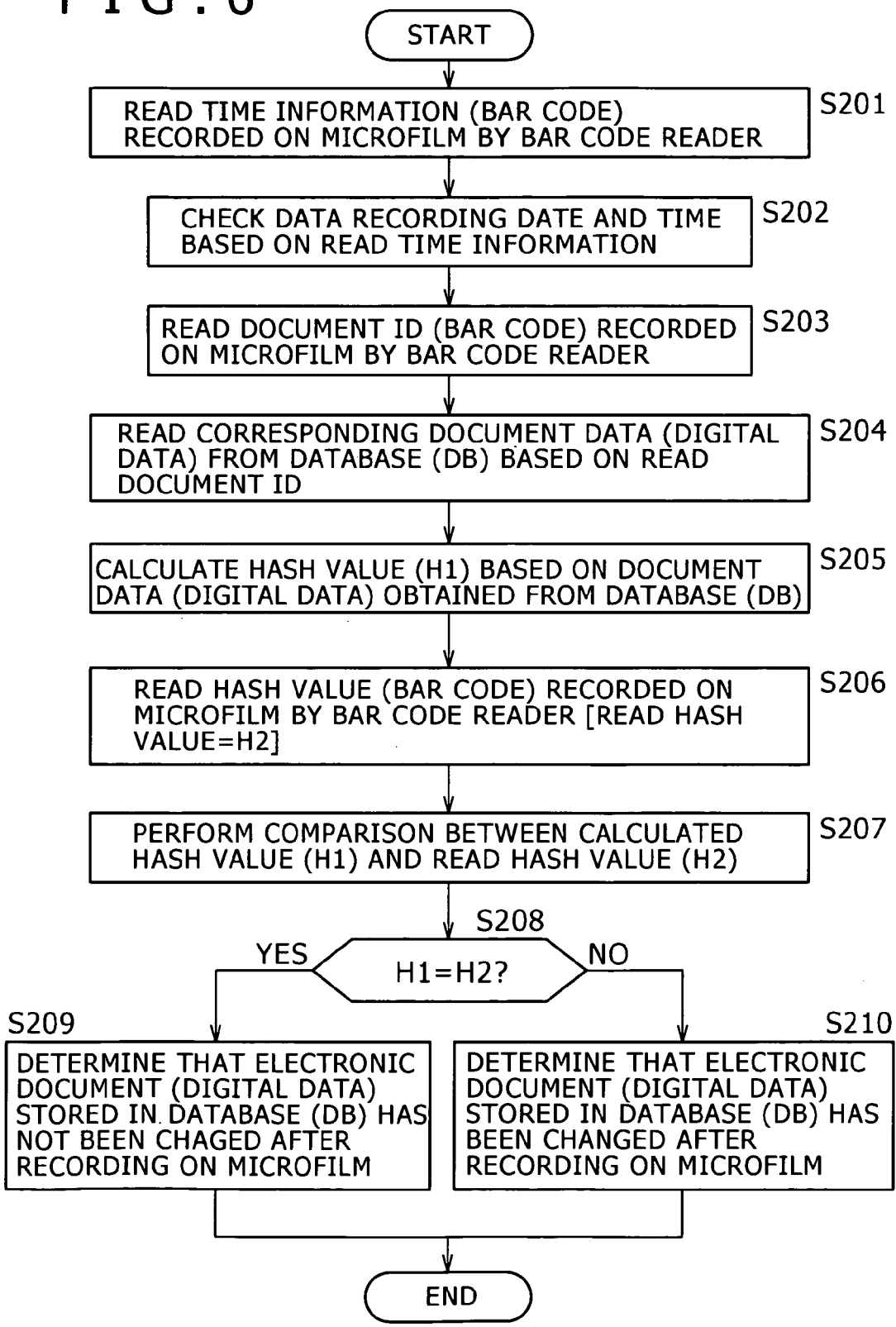
FIG. 6 is a flowchart showing data verification processing based on recorded information in the microfilm generated by the document management apparatus according to an embodiment of the present invention.

Next, a data verification sequence based on information recorded on a microfilm will be described with reference to FIG. 6.

First, at step S201, the time information recorded as a bar code on the microfilm is read by data reading processing using the microfilm reader 108 and the bar code reader 109. In FIG. 5A, the time information 304 is read, and in FIG. 5B, the time information 354 is read. At step S202, the date and time of data recording are checked based on the time information obtained from the bar code.

Next, at step S203, the document ID recorded as a bar code on the microfilm is read by data reading processing using the microfilm reader 108 and the bar code reader 109. In FIG. 5A, the document ID 303 is read, and in FIG. 5B, the document ID 353 is read. At step S204, the corresponding digital document data stored in the database (DB) 104 is obtained with the document ID obtained from the bar code as an index. The corresponding digital document data means digital document data corresponding to the document recorded as analog data on the microfilm.

At step S205, a hash value (H1) based on the digital document data obtained from the database (DB) 104 is calculated. The hash value (H1) is calculated by applying a predetermined hash function such as SHA-1 or MD5 to a constituent bit values of the digital document data as input values. Assuming that the hash function is (h) and the digital document data is (Document), the hash value (H1) is calculated as follows.

H1=h(Document)

Next, at step S206, a hash value (H2) recorded as a bar code on the microfilm by data reading processing using the microfilm reader 108 and the bar code reader 109. In FIG. 5A, the hash value 302 is read, and in FIG. 5B, the hash value 352 is read.

At step S207, comparison processing is performed between the hash value (H1) calculated based on the data stored in the database and the hash value (H2) recorded as a bar code on the microfilm. If the determination of correspondence is made at step S208, i.e., if H1=H2 holds (step S208=Yes)

the process proceeds to step S209, at which it is determined that the electronic document (digital data) stored in the database (DB) 104 has not been changed after the time of microfilm generation. Note that the generation of microfilm generation time means time authenticated with the time information recorded on the microfilm at step S202.

On the other hand, if the determination of correspondence is not made at step S208, i.e., if H1=H2 does not hold (step S208=No), the process proceeds to step S210, at which it is determined that the electronic document (digital data) stored in the database (DB) 104 has been changed after the time of microfilm generation.

In this manner, it can be checked whether or not digital data stored in the database has been changed after the time of microfilm generation processing based on the time information and the hash value based on the document data, recorded as bar codes on the microfilm. As the data proving construction of the present invention does not use proof data using a key requiring update processing as in the case of the simple protocol described in the background art, the update of proof data i.e. digital signature can be omitted, and further, the data publicizing processing in a publication such as a newspaper, which is necessary in the linking protocol, can be omitted.

The present embodiment provides a construction which can check the occurrence/nonoccurrence of digital data tampering after the time of microfilm generation, merely by storing the microfilm. This implements an efficient and low-cost document management system having a data proving function.

In the above-described embodiment 1, the processing using time information provided from the time information supply source 220 is performed without the time stamping authority (TSA) 210 shown in FIG. 3. Next, the example of processing utilizing the time stamping authority (TSA) 210 will be described as an embodiment 2.

The processing sequence according to the embodiment 2 will be described with reference to FIG. 7. FIG. 7 mainly shows data communication processing between the document management apparatus 100 and the time stamping authority (TSA) 210. Note that the time stamping authority (TSA) 210 is a trusted third party which receives time information from the reliable time information supply source 220.

At step S301, the document management apparatus 100 obtains a processing subject document, i.e., digital document data, for which proving of occurrence/nonoccurrence of tampering, the date and time of generation, the date and time of update and the like is required, stored in the database (DB) 104, and generates a hash value (H) based on the obtained digital document data. The hash value generation processing is performed by the hash processor 103 as in the case of the embodiment 1.

At step S302, the document management apparatus 100 transmits the generated hash value (H) to the time stamping authority (TSA) 210. At step S303, the time stamping authority (TSA) 210 applies a digital signature using a private key in the time stamping authority (TSA) 210 to data obtained by combining the hash value (H) received from the document management apparatus 100 with the latest time information received from the time information supply source 220.

At step S304, the time stamping authority (TSA) 210 transmits the digital signature data as proof data 450 to the document management apparatus 100. The proof data 450 is encrypted data where a digital signature is applied to the data obtained by combining hash value (H) with the time information.

At step S305, the document management apparatus 100 performs signature verification on the proof data 450 received from the time stamping authority (TSA) 210. The signature verification is performed as data decrypting processing using a public key for the time stamping authority (TSA) 210. If the verification is established, i.e., it is determined that the authentication is valid proof data generated by the time stamping authority (TSA) 210, the hash value (H) and the time information are obtained from the proof data 450.

Next, the document management apparatus 100 performs microfilm generation processing at step S306. The sequence of microfilm generation is performed as processing according to the sequence described with reference to FIG. 4 in the embodiment 1. Note that the hash value and the time information recorded on the microfilm are the data obtained from the proof data 450 received from the time stamping authority (TSA) 210.

As a result, as in the case of the embodiment 1, a microfilm where the document data, and the document ID, the hash value and the time information converted to bar codes are recorded, is generated. The data verification processing using the microfilm is the same as that in the embodiment 1, and is performed by the processing sequence described with reference to FIG. 6.

The present embodiment differs from the embodiment 1 in that the proof data received from the time stamping authority is utilized. In the embodiment 2, as the time stamping authority performs processing to receive a hash value from the document management apparatus and generate authentic data, the hash value is held on the time stamping authority, and time information and the like set in the generated proof data are held at this time. In this arrangement, proving of data based on data held in the time stamping authority as a third organization can be ensured.

Finally, the hardware construction of the document management apparatus 100 to perform the above-described processing will be described with reference to FIG. 8.

A CPU (Central Processing Unit) 501 is a controller which performs processing according to the OS (Operating System) and the various computer programs describing the respective processing execution sequences such as the microfilm generation processing and the data verification processing described in the above embodiments. Note that the computation processing accompanying the hash value generation using a predetermined hash function is also performed in accordance with a computation processing program under the control of the CPU 501.

A ROM (Read Only Memory) 502 holds the programs and operation parameters used by the CPU 501. A RAM (Random Access Memory) 503 holds the programs used upon execution by the CPU 501 and parameters which arbitrarily change upon execution of the programs. These memories are mutually connected via a host bus 504 which is a CPU bus or the like.

The host bus 504 is connected to an external bus 506 such as a PCI (Peripheral Component Interconnect/Interface) bus via a bridge 505.

A keyboard 508 and a pointing device 509 are input devices operated by a user. A display 510, having a liquid crystal display or a CRT (Cathode Ray Tube), displays various information in the form of text or image.

An HDD (Hard Disk Drive) 511, including a hard disk, drives the hard disk, and records or reproduces the programs executed by the CPU 501 and information. The hard disk serves as the database (DB) 104 shown in FIG. 3. Further, various computer programs such as various data processing programs are stored in the hard disk.

A drive 512 reads data or program recorded on a removable recording medium 521 such as a magnetic disc, an optical disc, a magneto-optical disc or a semiconductor memory, attached to the apparatus, and supplies the read data or program to the RAM 503 connected via an interface 507, the external bus 506, the bridge 505 and the host bus 504. The removable recording medium 521 also serves as the database (DB) 104 shown in FIG. 3.

A connection port 514 which is a port for connection with an external connection device 522, has a connection portion such as a USB port or an IEEE 1394 port. The connection port 514 is connected to the CPU 501 and the like via the interface 507, the external bus 506, the bridge 505, the host bus 504 and the like. A communication unit 515, connected to a network, performs communication processing for data communication with the outside, e.g., time information supply source or the time stamping authority (TSA).

The microfilm reader/writer 531 performs data writing processing and data reading processing on the microfilm. A bar code processor 532 performs barcode data generation and bar code reading processing.

Note that the hardware construction of the document management apparatus shown in FIG. 8 is an example of the apparatus applied to a PC. The document management apparatus of the present invention is not limited to the construction shown in FIG. 8, but any construction may be employed as long as the processing as described in the above embodiments can be executed.

Note that the series of processing described in the specification can be performed by a hardware construction or a software construction, or by a combined hardware and software construction. In the case of execution by the software construction, a program where the processing sequence is recorded is installed into a computer memory incorporated in specialized hardware and is executed there, otherwise, the program is installed into a general-purpose computer capable of executing various processing and is executed there.

For example, the program may be previously recorded in a hard disk or a ROM (Read Only Memory) as a recording medium. Otherwise, the program may be temporarily or permanently stored (recorded) on a removable recording medium such as a flexible disc, a CD-ROM (Compact Disc Read Only Memory), an MO (Magneto optical) disc, a DVD (Digital Versatile Disc), a magnetic disc, or a semiconductor memory. Such a removable recording medium can be provided as so-called package software.

Note that the program is installed from the removable recording medium as described above to a computer, and further, the program may be transmitted to the computer by wireless communication from a download site, or transferred by cable communication to the computer via a network such as a LAN (Local Area Network) or the Internet. The computer receives the program transferred as described above, and installs the program in its internal recording medium such as a hard disk.

Note that the various processing described in the specification is time sequentially performed in accordance with the description, further, the processing may be performed in parallel or independently in accordance with the processing performance of the apparatus or necessity. Further, the system in the specification means a logical set of plural apparatuses, but the respective constituent apparatuses are not necessarily arranged in one casing.

As described above, according to the construction of the present invention, converted document data, corresponding to digital data stored in a database for managing document data as digital data, is recorded on a microfilm, and a document ID of the document data, time information of recording processing, and a hash value based on the document data are recorded by using, e.g., bar codes. In this arrangement, it can be checked based on the hash value whether or not the digital data stored in the database has been changed after the recording processing of the document data on the microfilm. That is, if a hash value (H1) newly calculated based on the document data stored as digital data in the database corresponds with the hash value (H2) read from the microfilm, it can be determined that the digital data has not been changed after the time of recording on the microfilm. Thus the arrangement can be utilized as a document data management system which performs necessary verification of data tampering and the like.

As described above, according to an aspect of the invention, there is provided a document management apparatus including: a hash generator that generates a hash value based on digital document data stored in a database; a communication unit that inputs time information; and a microfilm writer that performs processing to record a converted document data, converted to image data based on the digital document data, on a microfilm, and record a document ID as identification information of the converted document data recorded on the microfilm, the hash value, and the time information, on the microfilm.

Further, according to an embodiment of the document management apparatus of the present invention, the document management apparatus may further include a bar code generator that converts the document ID, the hash value and the time information into bar codes, and the microfilm writer may record the document ID, the hash value and time information, as bar code information generated by the bar code generator, on the microfilm.

Further, according to another embodiment of the document management apparatus of the present invention, the document management apparatus may further include: a microfilm reader that reads information from the microfilm where the document ID, the hash value and the time information, with the converted document data, are recorded; and a data processor that performs comparison processing between a hash value calculated based on the digital document data stored in the database and the hash value read from the microfilm, and occurrence/nonoccurrence of data tampering is checked based on a result of the comparison.

Further, according to another embodiment of the document management apparatus of the present invention, the communication unit may transmit the hash value based on the digital document data, generated by the hash generator, to a time stamping authority, and receive proof data where a digital signature is applied to data including the hash value and the time information from the time stamping authority, and the document management apparatus may have a data processor that performs signature verification processing on the proof data, and on the condition that no data tampering has been made, obtain the hash value and the time information from the proof data, further, the microfilm writer may record the hash value and the time information, obtained from the proof data received from the time stamping authority, on the microfilm.

Further, according to another aspect of the invention, there is provided a storage medium readable by a computer, the storage medium storing a computer program of instructions executable by the computer to perform a function for document management processing on the computer, the function including: generating a hash value based on digital document data stored in a database; inputting time information; and performing processing to record a converted document data, converted to image data based on the digital document data, on a microfilm, and record a document ID as identification information of the converted document data recorded on the microfilm, the hash value, and the time information, on the microfilm.

Further, according to an embodiment of the storage medium storing a computer program of the present invention, the function may further include converting the document ID, the hash value and the time information into bar codes, wherein processing is performed to record the document ID, the hash value and time information, as generated bar code information, on the microfilm.

Further, according to another embodiment of the storage medium storing a computer program of the present invention, the function may further include: reading information from the microfilm where the document ID, the hash value and the time information, with the converted document data, are recorded; and performing comparison processing between a hash value calculated based on the digital document data stored in the database and the hash value read from the microfilm.

Further, according to another embodiment of the storage medium storing a computer program of the present invention, the function may further include: transmitting the hash value based on the digital document data, generated in the hash value generation, to a time stamping authority, and receiving proof data where a digital signature is applied to data including the hash value and the time information from the time stamping authority; and performing signature verification on the proof data, and on the condition that no data tampering has been made, obtaining the hash value and the time information from the proof data, wherein the hash value and the time information obtained from the proof data received from the time stamping authority are recorded on the microfilm.

Further, according to another aspect of the invention, there is provided a document management method including: generating a hash value based on digital document data stored in a database; inputting time information; and performing processing to record a converted document data, converted to image data based on the digital document data, on a microfilm, and record a document ID as identification information of the converted document data recorded on the microfilm, the hash value, and the time information, on the microfilm.

Note that the computer program of the present invention can be provided from a computer-readable storage medium, a communication medium, a recording medium such as a CD, FD or MO, or a communication medium such as a network, to a computer system which can execute various program codes. The program is provided in a computer-readable format, thereby processing corresponding to the program is implemented on the computer system.

Other features and advantages of the present invention will be apparent from the following description taken in conjunction with the accompanying drawings. Note that in the present specification, the system means a logical set of plural apparatuses, and the respective constituent apparatuses are not necessarily arranged in one casing.

According to the construction of the present invention, converted document data, corresponding to digital data stored in a database for managing document data as digital data, is recorded on a microfilm, and a document ID of the document recorded on the microfilm, time information on the recording processing, and a hash value based on the document data, are recorded by using, e.g., bar codes. In this arrangement, it can be checked based on the hash value whether or not the digital data stored in the database has been changed after the recording of the document data on the microfilm. That is, if a hash value (H1) newly calculated based on the document data stored as digital data in the database corresponds with the hash value (H2) read from the microfilm, it can be checked that the digital data has not been changed after the time recorded on the microfilm.

In the data proving construction of the present invention, as proof data using a key which requires update processing as in the case of the simple protocol is not utilized, update of proof data, i.e., digital signature is unnecessary. Further, the data publicizing in a publication such as a newspaper required in the linking protocol is unnecessary. By the construction of the present invention merely holding a microfilm, the occurrence/nonoccurrence of digital data tampering after the generation of microfilm can be checked, and an efficient and low-cost document management system having a data authentication function can be implemented.

Further, in an arrangement utilizing proof data received from a time stamping authority, as the time stamping authority receives a hash value from the document management apparatus and generates proof data, the hash value and time information and the like set for the generated proof data are stored on the time stamping authority at this time. Accordingly, proving of data based on data held in the time stamping authority as a third organization can be ensured.

As described above, the present invention has been described with reference to the particular embodiments. However, it is obvious for the persons skilled in the art that modifications and substitutions of the embodiments can be made without departing from the subject matter of the present invention. That is, as the present invention is disclosed in the form of exemplification, but is not directed to restrict interpretation. Therefore, to appraise the public of the scope of the present invention, the following claims are made.

The entire disclosure of Japanese Patent Application No. 2004-320143 filed on Nov. 4, 2004 including specification, claims, drawings and abstract is incorporated herein by reference in its entirety.

What is claimed is:

1. A document management apparatus comprising:
    a hash generator that generates a hash value based on digital document data stored in a database;
    a communication unit that inputs time information;
    a microfilm writer that performs processing to record a converted document data, converted to image data based on the digital document data, on a microfilm, and record a document ID as identification information of the converted document data recorded on the microfilm, the hash value, and the time information, on the microfilm; and
    a verification unit that verifies that the time information and the hash value have been digitally signed before the microfilm writer records the converted document data on the microfilm, wherein the document ID includes identification information for accessing the digital document data stored in the database.

2. The document management apparatus according to claim 1, further comprising a bar code generator that converts the document ID, the hash value and the time information into bar codes,
    wherein the microfilm writer records the document ID, the hash value and time information, as bar code information generated by the bar code generator, on the microfilm.

3. The document management apparatus according to claim 1, further comprising:
    a microfilm reader that reads information from the microfilm where the document ID, the hash value and the time information, with the converted document data, are recorded; and
    a data processor that performs comparison processing between a hash value calculated based on the digital document data stored in the database and the hash value read from the microfilm,
    wherein occurrence/nonoccurrence of data tampering is checked based on a result of the comparison.

4. The document management apparatus according to claim 1, wherein the communication unit transmits the hash value based on the digital document data, generated by the hash generator, to a time stamping authority, and receives proof data where a digital signature is applied to data including the hash value and the time information from the time stamping authority,
    the document management apparatus has a data processor that performs signature verification processing on the proof data, and on the condition that no data tampering has been made, obtains the hash value and the time information from the proof data, and
    the microfilm writer records the hash value and the time information, obtained from the proof data received from the time stamping authority, on the microfilm.

5. A storage medium readable by a computer, the storage medium storing a computer program of instructions executable by the computer to perform a function for document management processing on the computer, the function comprising:
    generating a hash value based on digital document data stored in a database;
    inputting time information;
    performing processing to record a converted document data, converted to image data based on the digital document data, on a microfilm, and record a document ID as identification information of the converted document data recorded on the microfilm, the hash value, and the time information, on the microfilm; and
    verifying that the time information and the hash value have been digitally signed before the converted document data is recorded on the microfilm, wherein the document ID includes identification information for accessing the digital document data stored in the database.

6. The storage medium storing a computer program according to claim 5, wherein the function further comprises:
    converting the document ID, the hash value and the time information into bar codes,
    wherein processing is performed to record the document ID, the hash value and time information, as generated bar code information, on the microfilm.

7. The storage medium storing a computer program according to claim 5, wherein the function further comprises:
    reading information from the microfilm where the document ID, the hash value and the time information, with the converted document data, are recorded; and
    performing comparison processing between a hash value calculated based on the digital document data stored in the database and the hash value read from the microfilm.

8. The storage medium storing a computer program according to claim 5, wherein the function further comprises:
    transmitting the hash value based on the digital document data, generated in the hash value generation, to a time stamping authority, and receiving proof data where a digital signature is applied to data including the hash value and the time information from the time stamping authority: and
    performing signature verification processing on the proof data, and on the condition that no data tampering has been made, obtaining the hash value and the time information from the proof data, wherein the hash value and the time information obtained from the proof data received from the time stamping authority are recorded on the microfilm.

9. A document management method comprising:

generating a hash value based on digital document data stored in a database;

inputting time information;

performing processing to record a converted document data, converted to image data based on the digital document data, on a microfilm, and record a document ID as identification information of the converted document data recorded on the microfilm, the hash value, and the time information, on the microfilm; and verifying that the time information and the hash value have been digitally signed before the converted document data is recorded on the microfilm, wherein the document ID includes identification information for accessing the digital document data stored in the database, and wherein a processor performs each of the above steps.

10. The document management method according to claim 9 further comprising:

converting the document ID, the hash value and the time information into bar codes, wherein processing is performed to record the document ID, the hash value and time information, as generated bar code information, on the microfilm.

11. The document management method according to claim 9 further comprising:

reading information from the microfilm where the document ID, the hash value and the time information, with the converted document data, are recorded; and performing comparison processing between a hash value calculated based on the digital document data stored in the database and the hash value read from the microfilm.

12. The document management method according to claim 9 further comprising:

transmitting the hash value based on the digital document data, generated in the hash value generation, to a time stamping authority, and receiving proof data where a digital signature is applied to data including the hash value and the time information from the time stamping authority: and performing signature verification processing on the proof data, and on the condition that no data tampering has been made, obtaining the hash value and the time information from the proof data, wherein the hash value and the time information obtained from the proof data received from the time stamping authority are recorded on the microfilm.

13. The document management apparatus according to claim 1, wherein the time information represents a time when the image data is recorded on the microfilm.

14. The storage medium storing a computer program according to claim 5, wherein the time information represents a time when the image data is recorded on the microfilm.

15. The document management method according to claim 9, wherein the time information represents a time when the image data is recorded on the microfilm.

* * * * *